United States Patent [19]

Pollak

[11] Patent Number: 5,100,091

[45] Date of Patent: Mar. 31, 1992

[54] COLLAPSIBLE AND PORTABLE ARTICLE-HOLDING ASSEMBLY FOR VEHICLES AND WHEELCHAIRS AND ARMCHAIRS AND THE LIKE

[76] Inventor: Steven H. Pollak, 18472 Hillcrest Ave., Villa Park, Calif. 92667

[21] Appl. No.: 590,232

[22] Filed: Sep. 28, 1990

[51] Int. Cl.⁵ .................................................. E04G 3/00
[52] U.S. Cl. .................................................... 248/278
[58] Field of Search ............... 248/278, 279, 282, 283, 248/285, 289.1, 298, 313; 108/112, 152, 44; 24/616, 617

[56] References Cited

U.S. PATENT DOCUMENTS

| | | | |
|---|---|---|---|
| 2,605,069 | 7/1952 | Gillaspy | 248/278 X |
| 3,348,799 | 10/1967 | Junkel et al. | 248/283 |
| 3,366,430 | 1/1968 | Diedrich | 248/285 X |
| 3,929,309 | 12/1975 | De Vore | 248/279 X |
| 4,174,669 | 11/1979 | Lalonde | 108/44 |
| 4,672,289 | 6/1987 | Davidson | 108/44 X |
| 4,735,388 | 4/1988 | Marks | 248/278 X |
| 4,815,688 | 3/1989 | Wood | 248/283 |
| 4,842,174 | 6/1989 | Sheppard et al. | 108/45 X |
| 4,881,305 | 11/1989 | Rivera | 24/616 |
| 4,953,822 | 9/1990 | Sharber et al. | 248/278 |

Primary Examiner—Ramon O. Ramirez
Attorney, Agent, or Firm—Irell & Manella

[57] ABSTRACT

An article-holding assembly for holding a variety of articles in a vehicle or on a wheelchair or armchair or the like includes an anchoring member having a pillar portion for fitting in an aperture or having a clamp portion for clamping a part in a vehicle or on a wheelchair, a holding and locking member which has a panel with a locking convex portion thereon for holding and locking an article by snapping the convex portion in a complementary opening of a complementary lock member on an article to be held, and a simple adjusting and securing member having a screw and a knob or adjustment for securing the anchoring member with the holding and locking member. The article-holding assembly can further include a supporting arm member which can be easily connected to the anchoring member and the holding and locking member for lengthening the article-holding assembly. The article-holding assembly of the present invention is easily installed, detached, adjusted, carried and manufactured.

27 Claims, 4 Drawing Sheets

COLLAPSIBLE AND PORTABLE ARTICLE-HOLDING ASSEMBLY FOR VEHICLES AND WHEELCHAIRS AND ARMCHAIRS AND THE LIKE

BACKGROUND OF THE INVENTION

1. Field of the Invention

The present invention relates to a mechanism for holding various kinds of articles, and particularly to an article-holding assembly for a vehicle or a wheelchair, which is collapsible, portable and convenient for adjusting the position of an article to be held.

2. Description of the Prior Art

It is often desirable to have an article-holding mechanism for holding certain things, such as a tray, a cup, and the like when sitting or travelling in a vehicle such as in an automobile or in a boat or on a wheelchair or in fact when sitting in an armchair. So far various types of such devices have been disclosed, for example, by U.S. Pat. No. 4,174,669 issued on Nov. 20, 1979 to A. Roger Lalonde, U.S. Pat. No. 4,852,499 issued on Aug. 1, 1989 to Ilmars Ozols, U.S. Pat. No. 4,359,004 issued on Nov. 16, 1982 to Austin Chappell, U.S. Pat. No. 4,877,164 issued on Oct. 31, 1989 to Walter H. Baucom, U.S. Pat. No. 4,672,898 issued on June 16, 1987 to Henry A. Davidson, U.S. Pat. No. 2,657,107 Issued on Oct. 27, 1953 to T. Bisaga et al., and U.S. Pat. No. 4,842,174 issued on June 27, 1989 to Mark E. Sheppard et al.

U.S. Pat. No. 4,877,164 discloses a holding device for a vehicle. The holding device comprises a mounting means having a hollow cylindrical member with a tab thereon and a slot therein, an articulated member which includes a plug means having a radially extending key mating with the slot in the mounting means and a detent-type joining means having a hub with a plurality of external teeth or splines and a pair of hooks as an additional axial fastening means, and a cup holding means which also has a joint means having a collar with a plurality of internal teeth or splines for intermeshing with the teeth on the hub and fastened in place by the hooks. In use, the mounting means is inserted into a cigarette lighter opening in a vehicle, the plug means is inserted into the cylindrical hollow on the mounting means with the key fitting within the slot and the plug means is rotated 90° so that it is locked therein. The device may include another articulated member having two similar joint means for lengthening the device. It is obvious that the structure of the device, specifically, the connection portions of the device, are complicated so that such device is not easily manufactured. Another significant shortcoming for such device is that during use, such as in having lunch, the device must be detached in order to adjust the position of the article being held. This is clearly very inconvenient.

Further, conventional devices are normally designed to hold one or two particular types of articles, such as a table, or a cup holder, or a telephone or the like so that it is not convenient for changing them frequently to hold various kinds of articles. Furthermore, most of the conventional devices can not be easily installed, detached and carried in a small box or a suitcase. However, since the dimensions and structure of a vehicle interior or a wheelchair or an armchair varies from one to another, and the habits of people differs from person to person, it is desirable that an article-holding device can be easily adjusted to hold various kinds of articles. For example, people sometimes may want to paint from life or nature in a bus or a car. In this case, the paper-holding board is required to be held at a certain angle with respect to the eyes of the artist. Sometimes, people may want to heat water or eat food, so that a heater or a tray may have to be supported in a horizontal manner in the vehicle or on a wheelchair. All these requirements or possible choices of application for an article-holding device for a vehicle or a wheelchair require it to be easily adjustable, easily detachable and easily portable. However, the prior art devices do not very well satisfy those requirements.

The present invention discloses an improved article-holding device which can be used in vehicles or on wheelchairs or armchairs and the like.

OBJECT OF THE INVENTION

It is an object of the present invention to provide an improved article-holding assembly which can hold a variety of articles on a wheelchair or armchair or in an automobile, or a boat or an aircraft.

It is another object of the present invention to provide an improved article-holding assembly for a vehicle or a wheelchair or the like, which is collapsible.

It is still another object of the present invention to provide an improved article-holding assembly for a vehicle or a wheelchair or the like, which can reliably hold various kinds of articles and has a simple connection structure.

It is still another object of the present invention to provide an improved article-holding assembly for a vehicle or a wheelchair or the like, whereby the position or angle of an article to be held can be easily adjusted during use.

It is a further object of the present invention to provide an improved article-holding assembly for a vehicle or a wheelchair or the like which can be easily installed and detached.

It is still a further object of the present invention to provide an improved article-holding assembly for a vehicle or a wheelchair or the like, which can be easily manufactured at low cost.

These and other objects and advantages of the present invention will become apparent after studying the following descriptions of the present invention.

SUMMARY OF THE INVENTION

The present invention constitutes an improved article-holding assembly for holding a variety of articles in a vehicle, which includes an anchoring means having a first end connection portion with a connection hole thereon and a pillar portion for fitting into an aperture in a vehicle interior to form a position-adjustable attachment with the surface of the aperture, a holding and locking means having a second end connection portion with a connection hole thereon and a lock panel with a locking convex portion for holding and locking an article by snapping said convex portion in a complementary lock member on an article, a supporting arm means which has a third and fourth end connection portion with respective connection holes thereon for an adjustable connection with the anchoring means and the holding and locking means, and an adjusting and securing means for adjustably securing any two of the end connection portions through the connection holes thereon.

The aperture in the vehicle interior for receiving the pillar portion may be the cigarette lighter opening, but preferably is formed on a bracket member which is fixed on a wall or a surface of the vehicle interior. Instead of having a pillar portion, the anchoring means may be fixed on any suitable place by having a clamp element. The holding and locking means preferably further includes a second panel with an end integrally formed with the second end connection portion and with another end attached with the lock panel in such a clip configuration that the lock panel tends to separate from the second panel under an outward tension or elastic force. In use, the holding and locking means is squeezed and inserted into the complementary locking member fixed on an article, which has a locking opening for locking the locking convex therein. The supporting arm means can include two arm members which can be jointed together through respective connection portions or in a telescopic relationship. In some situations, the supporting arm means may not be necessary. The adjusting and securing means preferably includes a screw or bolt, a washer and a knob or adjustment which can adjustably secure any two of the end connection portions through the connection holes thereon. The article-holding assembly of the present invention can also be used on a wheelchair for helping disabled people or on an armchair or the like.

BRIEF DESCRIPTION OF THE DRAWINGS

FIG. 3A is a front view of a bracket member which can be used for securing an article-holding assembly of the present invention on a wall of a vehicle interior or a wheelchair or armchair or the like.

DETAILED DESCRIPTION OF THE INVENTION

Figure 1A:
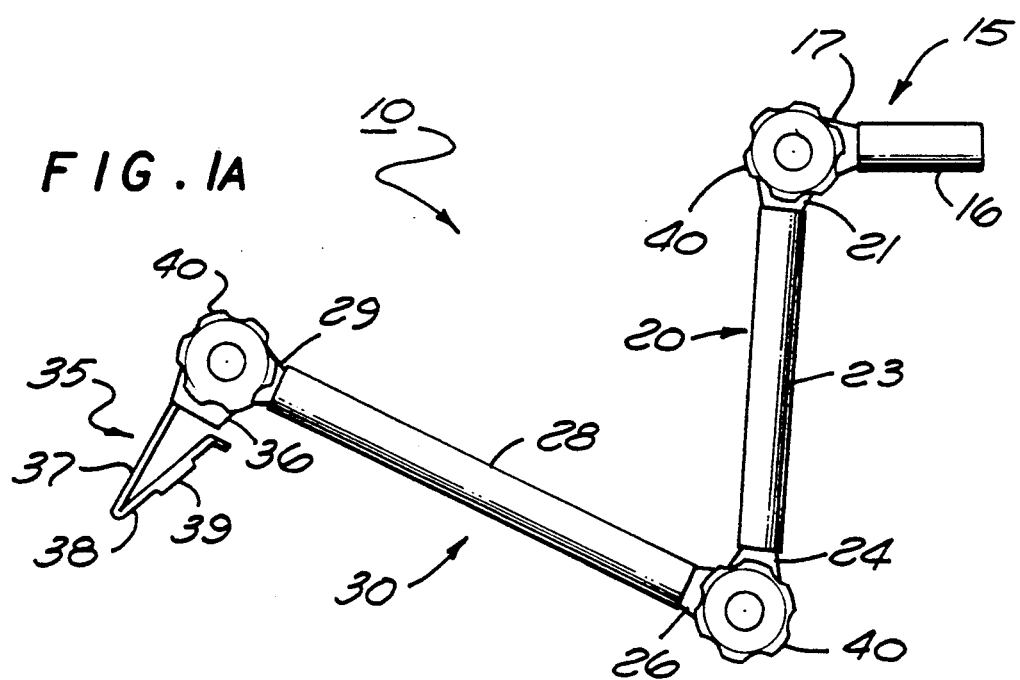
FIG. 1A and 1B are side views of two embodiments of an article-holding assembly of the present invention which have different supporting arm members.

Turning now to FIG. 1A, shown is an embodiment of an article-holding assemble 10 of the present invention for holding a variety of articles in a vehicle or on a wheelchair or armchair or the like. The article-holding assembly 10 includes an anchoring member 15 for anchoring the assembly 10 in an aperture in a vehicle interior or on a wheelchair, two supporting arm members 20 and 30 adjustably secured on the anchoring member 15 for adjustably fixing a holding and locking member 35 which can hold and lock an article at a desired position.

The anchoring member 15 has an end connection portion 17 and a cylindrical pillar or post portion 16 for fitting in an aperture on a wheelchair, armchair or in the vehicle interior. The aperture may be formed on a bracket member or the cigarette lighter opening in the vehicle. Instead of having a pillar portion 16, the anchoring member can have a clamp element (not shown) for directly clamping a edge of a wall or any suitable parts on a wheelchair or in a vehicle. The clamp element is soldered or integrally formed with the end connection portion 17 of the anchoring member and has a high clamping ability under a force supplied by a strong spring thereon. As another alternative, the anchoring means may include a suction element for adhering to a window of a vehicle, especially where the articles to be held are not very heavy. It should be understood that the anchoring member may also be permanently mounted on a wheelchair, armchair or in a vehicle.

The supporting arm member 20 and 30 respectively have a cylindrical body portion 23 and 28, and two end connection portions 21, 24 and 26, 29. The two arm members 20 and 30 are adjustably secured to each other through the end connection portions 24 and 26. The holding and locking member 35 includes a connection portion 36, a first panel 37 having one end integrally formed with the connection portion 36, and a second panel 38 having a locking convex or protuberance 39 thereon. The second panel 38 is integrally formed with the first panel 37 at one end in such a way that a clip configuration is provided. In other words, another end of the second panel 38 tends to separate from the first panel 38 under a tension or elastic force. This result may be achieved by using an elastic material and a special process for making the panel 37 and 38 or using a spring disposed between the two panels 37 and 38. In another approach (not shown), the holding and locking member 35 may include only a single panel which has a locking convex fixed thereon and extending outward under spring force in the locking convex so that during use the locking convex can be pressed or squeezed down by fingers. An adjusting and securing member 40 is provided for angle-adjustably securing the connection between any two of the members 15, 20, 30 and 35 through the end connection portions. The adjusting and securing member 40 can be any of the known frictional or spring loaded mechanical detent mechanisms.

Figure 1B:
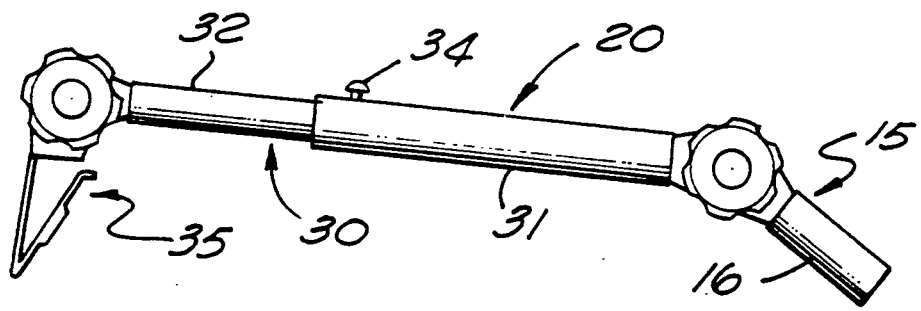

FIG. 1B shows another embodiment of the article-holding assembly 10 of the present invention, which includes two supporting arm members 20 and 30 respectively having a tube portion 31 and 32. The tube portion 31 of the arm member 20 has an inner diameter larger than the outer diameter of the tube portion 32 of the arm member 30 so that the two tube portions 31 and 32 are in a telescopic relationship. The arm member 20 further includes an adjustment or a screw knob with the screw through the surface of tube 31 for fixing tube 32 therein and adjusting its position. It should be understood that in some cases the supporting arm member 20 and 30 may not be needed.

Figure 2:
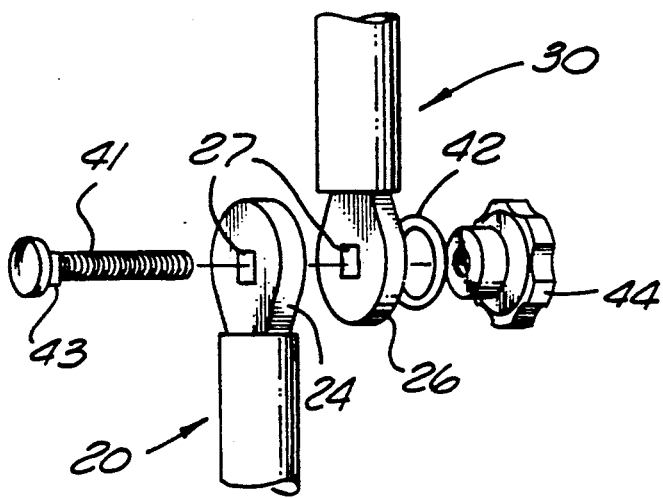
FIG. 2 is a stereographic view of a preferred embodiment of an adjusting and securing member and end connection portions of the members of the article-holding assembly of the present invention.

FIG. 2 illustrates one suitable embodiment of the adjusting and securing member 40 and the end connection portions of the members 15, 20, 30, and 35. The adjusting and securing member 40 comprises a screw or bolt 41, a washer 42 and an adjustment or knob 44. The washer 42 is preferably a rubber washer. Each of the end connection portions 15, 21, 24, 26, 29 and 36 has two plane surfaces and a square-shaped hole 27 therethrough. The screw 41 also has a square-shaped neck 43 for fitting in the hole 27 to prevent rotation. An additional rubber washer may be provided between two end connection portions to achieve more reliable attachment of two members. Many other kinds of frictional or mechnical adjustment mechanisms are suitable.

Figure 3A:
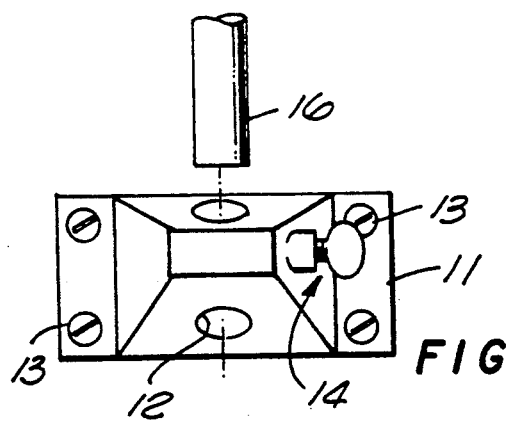
Figure 3B:
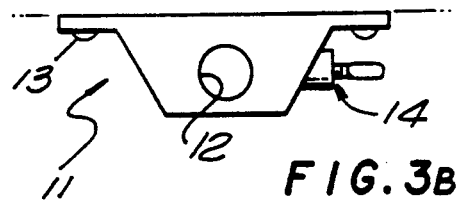
FIG. 3B is a top view of a bracket member shown in FIG. 3A.
Figure 3C:
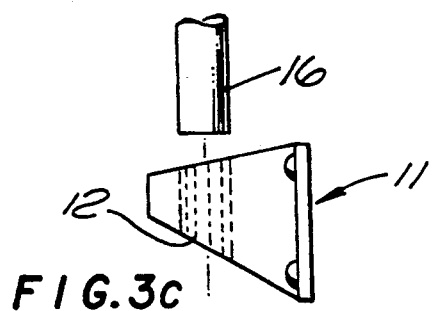
FIG. 3C is a side view of another embodiment of a bracket member which has an aperture with a multi-side surface for holding a pillar portion in the same shape.
Figure 3D:
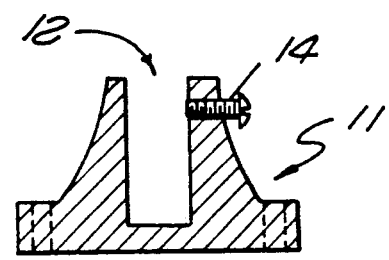
FIG. 3D is a cross-sectional view of still another embodiment of the bracket member which can be mounted on the floor of a vehicle interior.

The article-holding assembly 10 of the present invention can be provided with a bracket member 11, as shown in FIG. 3A–3D, which is mounted on a wall or a convenient surface of the vehicle interior or a wheelchair or armchair. A bracket member 11 having a cylindrical aperture 12 for receiving a circular pillar portion 16 of the anchoring member 15 is shown by FIG. 2A and 2B. The member 11 is mounted on a wall in a vehicle or on a wheelchair by screws 13 and has a screw tightening element 14 for securing the pillar portion 16 in the aperture 12. As an alternative, the aperture 12 and the pillar portion 16 may have a multi-side shape as shown in FIG. 3C. FIG. 3D shows another alternative of the bracket member 11 which is mounted on a substantial horizontal surface in a vehicle. It should be understood that although a bracket member is preferably used in the present invention, the pillar portion of the anchoring means can be designed also for fitting into a cigarette lighter opening in vehicles.

Figure 4A:
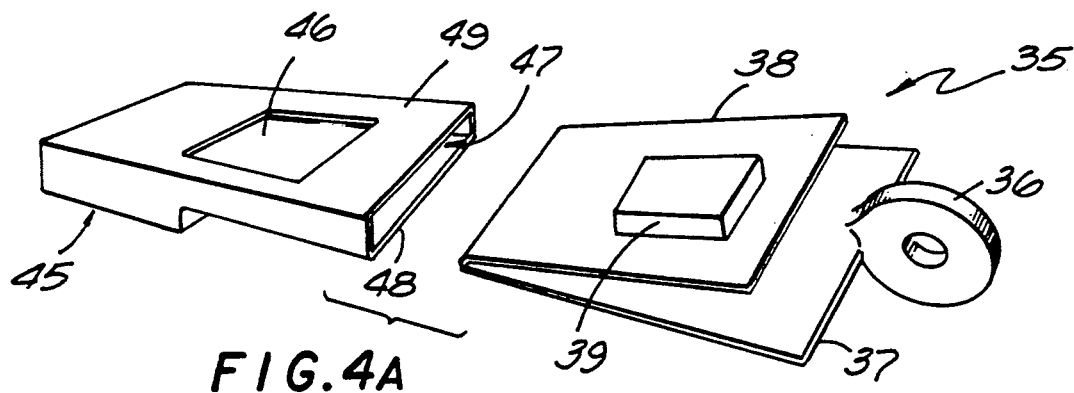
FIG. 4A is a stereographic bottom view of a complementary locking member on an article, and a holding and locking member of the article-holding assembly of the present invention.
Figure 4B:
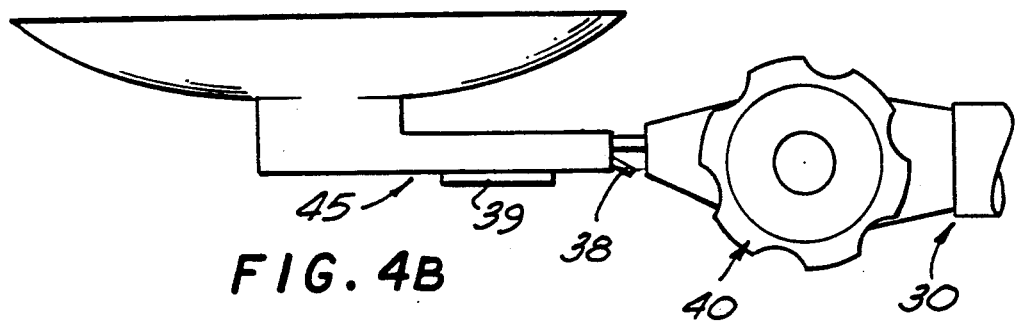
FIG. 4B is a side view of a complementary locking member formed on an article and secured by a holding and locking member of the article-holding assembly of the present invention.

FIG. 4A and 4B show an embodiment of a complementary locking member 45 of the present invention which is integrally formed on the bottom of an article and can be secured on the holding and locking member 35 of the article-holding assembly of the present invention. The complementary locking member 45 includes a cavity 47 with two panels 48 and 49, wherein at least panel 49 has an opening 46 complementary in shape with the locking convex 39 of the holding and locking member as shown in FIG. 4A. During use, the two panels 37 and 38 of the holding and locking members are squeezed and inserted into the cavity 47 of the complementary locking member 45 so that the locking convex 39 is locked in the locking opening 46 as shown in FIG. 4B. The holding and locking member 35 may have only a single panel with a locking convex thereon which can be pressed down due to the springs under the convex, as described previously. Such a complementary locking member 45 can be integrally formed on any suitable article, such as a cup, a tray, a bowl, a telephone holder, etc.

Figure 5A:
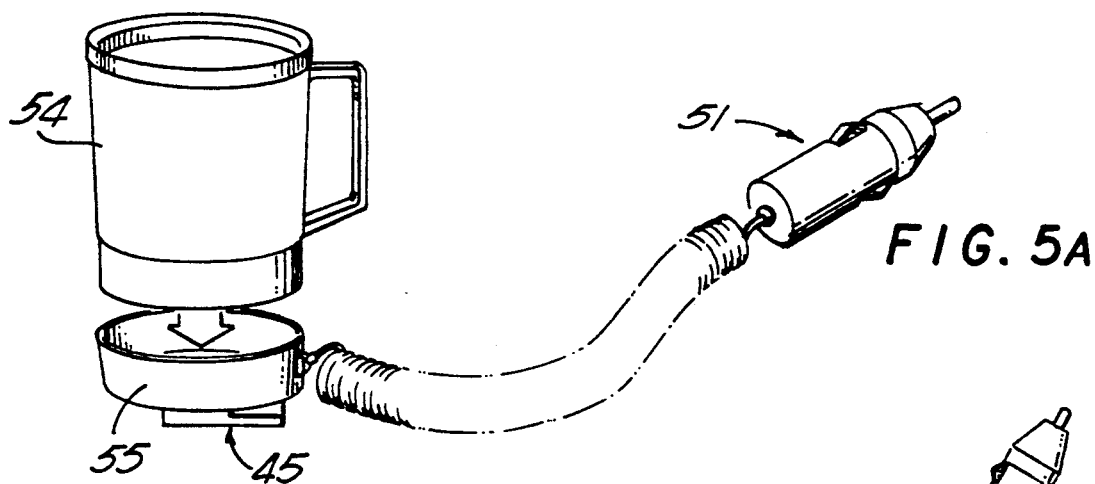
FIGS. 5A and 5B are stereographic views of a water or coffee warmer and a cold beverage holder, which can be used in the present invention.
Figure 5B:
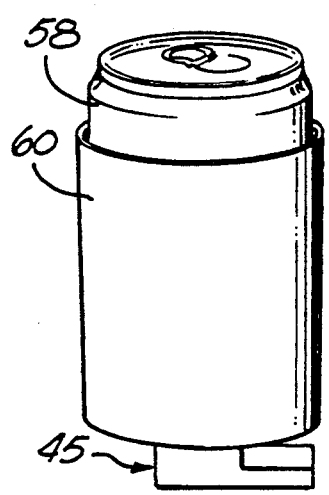
Figure 5C:
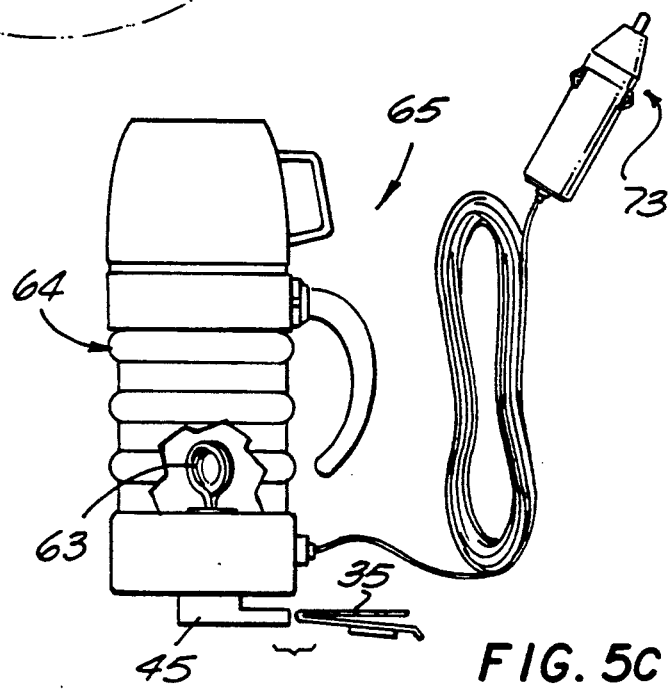
FIG. 5C is a perspective view of a liquid heater which can be used in the present invention.

FIGS. 5A, 5B and 5C respectively show a water or a coffee warmer 55, a cold beverage holder 60 and a liquid heater 65 which respectively have a complementary locking member 45 of the present invention fixed on the bottom. The coffee warmer 55 and the heater 65 respectively has an electric plug for plugging into the cigarette lighter opening for obtaining electric power. A cup 54 can be put in the warmer 55. The liquid heater 65 is provided with a heating member 63 disposed in a container 64 for heating liquid therein. The cold beverage holder 60 may have dimensions suitable for receiving some ice and a can or a cup or a bottle 58.

Figure 6A:
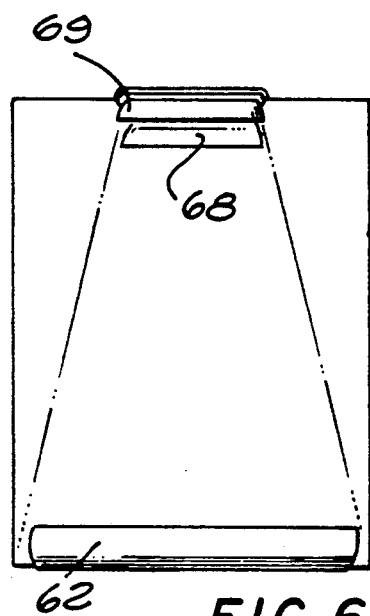
FIG. 6A and 6B are respectively a front view and a side view of a map or a paper holder which can be used in the present invention.
Figure 6B:
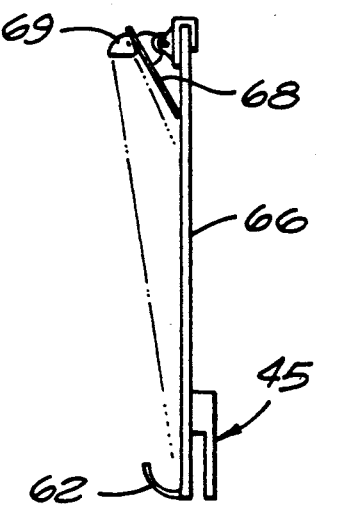

A map or paper holding board 70 which can be used in the present invention, is shown in FIG. 6A and 6B. The board 70 preferably includes a plate 66 with a complementary locking member 45 on its back, a paper and pen holder 62 attached on the bottom of the plate 66, a paper clip 68 attached on the head of the plate 66 for fixing a paper thereon under spring force, and a light 69 fixed on the paper clip 68.

Figure 7A:
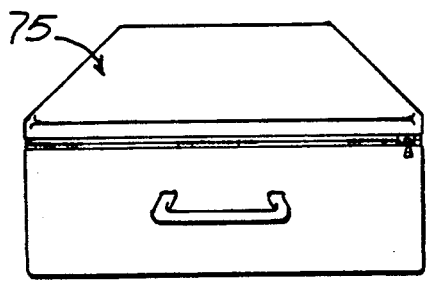
FIG. 7A and 7B show a suitcase for carrying an article-holding assembly and a set of articles of the present invention.
Figure 7B:
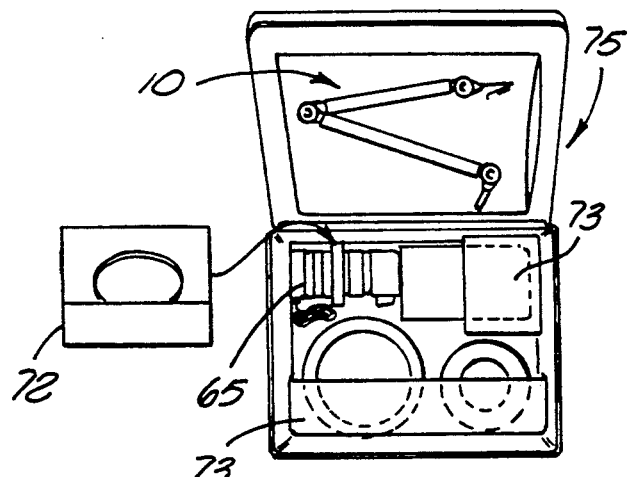
Figure 8A:
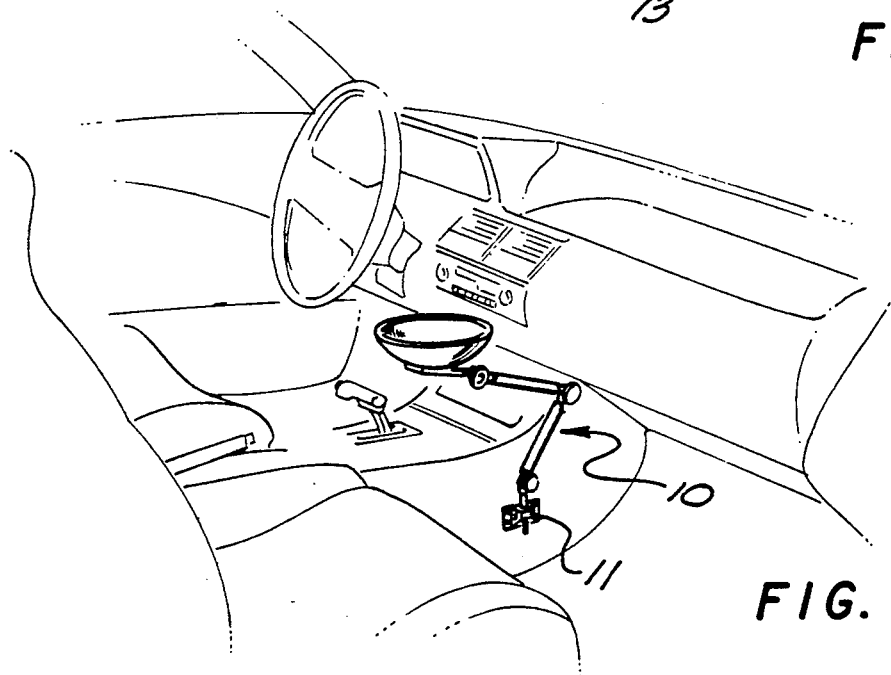
FIG. 8A and 8B schematically show applications of the article-holding assembly of the present invention in a car and a van.
Figure 8B:
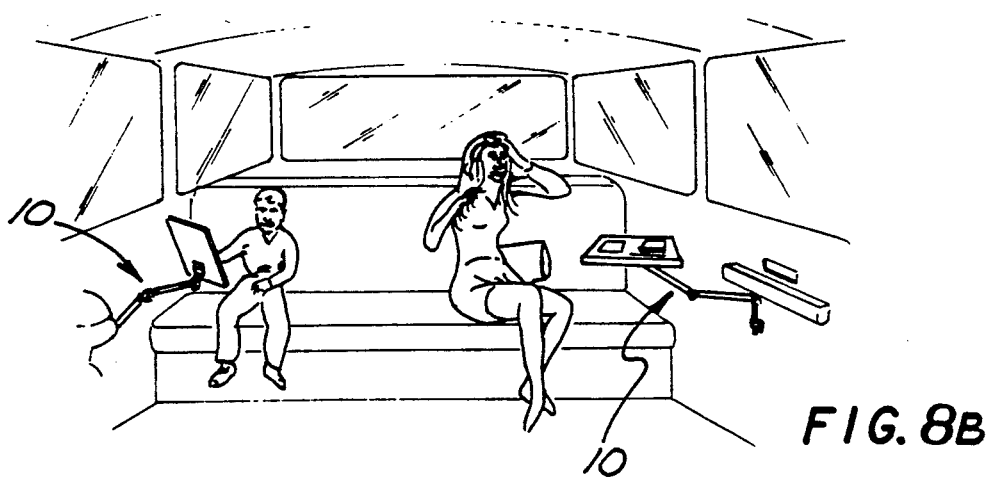

FIG. 8A and 8B show the application of the article-holding assembly 10 of the present invention in a car interior and a van interior. After the above discussion of the present invention, it is clear that the position and angle of any article being held by the holding assembly 10 can be easily adjusted during use. The assembly 10 can also be easily installed, attached and easily transported. An embodiment of a small box or a suitcase 75 for carrying a set of often-used articles and the assembly 10 of the present invention is illustrated in FIG. 7A and 7B, wherein a heater 65 is fixed in a trap 72 and a tray, a plate, a bowl and a holding assembly 10 are fixed in respective pockets 73.

While the preferred application of the present invention has been shown and described, it should be apparent to those skilled in the art that many more modifications are possible without departing from the invention concept herein described.

What is claimed is:

1. A collapsible and portable assembly for holding a variety of articles in a vehicle or on a wheel chair or armchair, comprising:
    an anchoring means for fixing on a wheelchair or in a vehicle interior, said anchoring means having a first end connection portion,
    a holding means for replaceably holding an article, said holding means having a second end connection portion fixable to said first end connection portion of said anchoring means, and a lock panel with a convex portion thereon for locking the article by snapping said convex portion in a complementary locking opening of a complementary lock member on said article.

2. A collapsible and portable assembly in accordance with claim 1, further including a supporting arm means which includes a third and fourth end connection portions, wherein said third end connection portion can be angle-adjustably fixed on said second end connection portion for angle-adjusting supporting said holding means, and said fourth end connection portion can be angle-adjustably secured to said first end connection portion.

3. A collapsible and portable assembly in accordance with claim 1, wherein said vehicle can be any of an automobile, a boat and an aircraft.

4. A collapsible and portable assembly in accordance with claim 1, wherein said various kinds of articles include a bowl, a tray, a plate, a coffee warmer, a beverage holder, a liquid heater, a map and paper holder.

5. A collapsible and portable assembly in accordance with claim 1, wherein said anchoring means includes a pillar portion for fitting in an apperture on a wheelchair or in a vehicle interior to form a position-adjustable attachment with a surface of said aperture.

6. A collapsible and portable assembly in accordance with claim 1, wherein said complementary lock member on an article includes a cavity with two panels, one of said panels having said locking opening complementary in shape with said locking convex portion on said lock panel so that said holding means can be squeezed and fed into said cavity for locking said convex in said locking opening.

7. A collapsible and portable assembly in accordance with claim 5, wherein said aperture is formed on a bracket means which is fastened on a wall or a convenient surface on a wheelchair or armchair or in a vehicle.

8. A collapsible and portable assembly in accordance with claim 5, wherein said aperture is a cigarette lighter opening in a vehicle.

9. A collapsible and portable assembly in accordance with claim 7, wherein said bracket means further includes a tightening means for securing said pillar in said aperture in a selected position.

10. A collapsible and portable assembly in accordance with claim 2, wherein said supporting arm means includes two supporting arm members in a common structure, each of which has two end connection portions with respective connection holes thereon so that said two arm members can be angle-adjustably attached to each other.

11. A collapsible and portable assembly in accordance with claim 2, wherein said supporting arm means includes two supporting arm members which are in telescopic relationship so that the length of said supporting arm means can be adjusted.

12. A collapsible and portable assembly in accordance with claim 1 or 2, wherein said each of end connection portions includes two plane surfaces with a connection hole therethrough for connection with other end connection portion.

13. A collapsible and portable assembly in accordance with claim 1 or 2, further including adjusting and securing means for securing any two of said connection portions, and adjusting the angle therebetween.

14. A collapsible and portable assembly in accordance with claim 13, wherein said adjusting and securing means includes a screw means, washer means, and knob means for tightening said connection or loosening said connection for adjustment of an angle between two of said connection portions.

15. A collapsible and portable assembly in accordance with claim 14, wherein said washer means includes rubber washers.

16. A collapsible and portable assembly in accordance with claim 12, wherein said hole on said each end connection portion is square-shaped.

17. A collapsible and portable assembly in accordance with claim 1, wherein said holding means further includes a second panel with an end integrally formed with said second end connection portion and with another end integrally formed with said lock panel in such a clip configuration that said lock panel tends to separate from said second panel under an outward tension or elastic force.

18. A collapsible and portable assembly in accordance with claim 13 further includes a carrying case for carrying said holding means, said supporting arm means, said adjusting and securing means, said anchoring means and a set of articles with said respective complementary lock members thereon.

19. A collapsible and portable assembly for holding a variety of articles in a vehicle or on a wheelchair or armchair, comprising:

an anchoring means for fixing on a wheelchair or in a vehicle, said anchoring means having a first end connection portion, a holding means for replaceably holding an article, said holding means including a second end connection portion and a clip means, said clip means having a support panel member integrally formed with said second end connection portion and a lock panel member with a locking convex or protuberance thereon and integrally formed with said panel member at one end in such a way that said lock member tends to separate from said panel member under an outward tension or elastic force, a supporting arm means which has a third end connection portion angle-adjustably connected to said second end connection portion for angle-adjustably supporting said holding means, and a fourth end connection portion angle-adjustably second on said first end connection portion.

20. A collapsible and portable assembly in accordance with claim 19, wherein said each article is provided thereon with a complementary lock member which includes a cavity with two panels, one of said panels including a locking opening complementary in shape with said locking convex so that said holding and locking means can be squeezed and sent into said cavity for locking said convex in said locking opening under said outward tension or elastic force.

21. A collapsible and portable assembly in accordance with claim 20, wherein said supporting arm means includes two supporting arm members, each of which has two arm end connection portions so that said two supporting members can be angle-adjustably connected to each other.

22. A collapsible and portable assembly in accordance with claim 20, wherein said supporting arm means includes two supporting arm members which are two tubes in a telescoping relation and which can be secured to each other by an adjustment means.

23. A collapsible and portable assembly in accordance with claim 20, wherein said each end connection portion includes a connection hole for connection with the other end connection portion.

24. A collapsible and portable assembly in accordance with claim 23, further including adjusting and securing means for adjustably securing two of said end connection portions through said holes.

25. A collapsible and portable assembly for holding various kinds of articles in a vehicle or on a wheelchair or armchair, comprising:

an anchoring means for fixing on a wheelchair or in a vehicle, said anchoring means having a first end connection portion with a hole thereon, a holding means which includes for replaceably holding an article, said holding means including a clip means and a second end connection portion with a hole thereon, said clip means having a support panel member integrally formed with said second end connection portion and a lock panel member with a locking convex or protuberant thereon and integrally formed with said panel member at one end in such a way that said lock member tends to separate from said member under an outward tension or elastic force, a supporting arm means which has a third and fourth end connection portions with respective holes thereon, wherein said third end connection portion is angle-adjustably connected to said second end connection portion for angle-adjustably securing said holding and locking means; and said fourth end connection portion is angle-adjustably mounted on said first end connection portion, an adjustable securing means for securing said supporting arm means with said anchoring means and said holding means through said holes on said end connection portions, and adjusting angles between said means.

26. A collapsible and portable assembly in accordance with claim 25, wherein said each article is provided thereon with a complementary locking member which includes a cavity with two panels, one of said panels including a locking opening complementary in shape with said locking convex so that said clip means can be squeezed and inserted into said cavity for locking said convex in said locking opening under said outward tension or elastic force.

27. A collapsible and portable assembly in accordance with claim 25, wherein said supporting arm means includes two supporting arm members which can be fixed together.

* * * * *